(12) United States Patent
Cock Foster et al.

(10) Patent No.: US 12,682,326 B1
(45) Date of Patent: Jul. 14, 2026

(54) TRANSFERRING SELF-CUSTODIED CRYPTOCURRENCY TOKENS USING MARKETPLACES

(71) Applicant: Gemini IP, LLC, New York, NY (US)

(72) Inventors: Duncan Cock Foster, New York, NY (US); Griffin Cock Foster, New York, NY (US); Patrick Craig McLaren, Long Island City, NY (US); Alberto Simon, Brooklyn, NY (US); Eric Neiman Winer, Jersey City, NJ (US)

(73) Assignee: Gemini IP, LLC, New York, NY (US)

( * ) Notice: Subject to any disclaimer, the term of this patent is extended or adjusted under 35 U.S.C. 154(b) by 0 days.

(21) Appl. No.: 17/707,836

(22) Filed: Mar. 29, 2022

(51) Int. Cl.
*G06Q 30/00* (2023.01)
*G06Q 20/02* (2012.01)
*G06Q 20/06* (2012.01)
*G06Q 20/36* (2012.01)

(52) U.S. Cl.
CPC .......... *G06Q 20/02* (2013.01); *G06Q 20/065* (2013.01); *G06Q 20/367* (2013.01); *G06Q 2220/123* (2013.01)

(58) Field of Classification Search
CPC ..................................................... G06Q 20/02
USPC ........ 705/39, 1.1, 66, 65, 41, 7.29; 713/171, 713/168
See application file for complete search history.

(56) References Cited

U.S. PATENT DOCUMENTS

| | | | | |
|---|---|---|---|---|
| 11,080,687 | B2 * | 8/2021 | Vladi .................. | G06Q 20/389 |
| 2022/0058634 | A1 * | 2/2022 | Yantis ................. | G06Q 20/123 |
| 2022/0366494 | A1 * | 11/2022 | Cella .................... | G06N 3/006 |

OTHER PUBLICATIONS

ProQuestDialogNPL Search History.*
Ip.com NPL Search History.*
STIC, EIC 3600 Serach Report, Feb. 2025, 5 pgs.

* cited by examiner

*Primary Examiner* — John H. Holly
(74) *Attorney, Agent, or Firm* — Lee & Hayes, P.C.

(57) ABSTRACT

Disclosed are various embodiments for transferring self-custodied cryptocurrency tokens using marketplaces. A marketplace service can determine that a first amount of a cryptocurrency has been transferred to a marketplace wallet address from a first user wallet address. Then, the marketplace service can, in response to a determination that the first amount of the cryptocurrency has been transferred to the marketplace wallet address, invoke a transfer function provided by a non-fungible token (NFT) smart contract, wherein the transfer function causes ownership of a non-fungible token (NFT) managed by the NFT smart contract to be transferred to a specified user wallet address. Subsequently, the marketplace service can, in response to the NFT being transferred to the specified user wallet address, send a second amount of the cryptocurrency from the marketplace wallet address to a second user wallet address.

18 Claims, 7 Drawing Sheets

116

TRANSFERRING SELF-CUSTODIED CRYPTOCURRENCY TOKENS USING MARKETPLACES

BACKGROUND

Non-fungible tokens (NFTs) are often traded on various electronic marketplaces. Some marketplaces allow for transactions to occur quickly by processing transactions off of the blockchain. For example, a purchase can deposit funds with a marketplace, while a seller of an NFT can deposit his or her NFT with the marketplace. The marketplace can then update its own database records to track the purchases, sales, and transfers of NFTs. However, sellers and purchases are unable to maintain custody of their assets when using these marketplaces.

In contrast other marketplaces utilize smart contracts to facilitate transactions on the blockchain. A user can execute a purchase function provided by a marketplace's smart contract to purchase an NFT from a seller. Funds are transferred from a wallet controlled by the purchaser to a wallet controlled by a seller, while the NFT is transferred from a wallet controlled by the seller to a wallet controlled by the purchaser. While the purchaser and the seller are able to maintain control and custody of their assets, the execution of the smart contract to facilitate the transaction requires that cryptocurrency transaction fees be paid. Moreover, the amount of transaction fees paid depends on the amount of computational steps performed by the marketplace's smart contract, with more intricate smart contracts that perform additional verification checks requiring more transaction fees to be paid compared to simpler smart contracts.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for the use of self-custodied cryptocurrency to purchase self-custodied non-fungible tokens (NFTs) using an exchange service. By allowing users to use self-custodied cryptocurrency to purchase self-custodied NFTs, the security of the transaction is improved because the risk that a third party (e.g., the exchange service) will lose a user's cryptocurrency or NFTs is reduced. However, the use of an exchange service to facilitate the transaction reduces transaction fees incurred by the relevant blockchain networks involved compared to decentralized finance (DeFi) solutions that rely on a smart contract to facilitate the entire transaction. As a result, the security of the transaction is increased while computational overhead, as reflected by the transaction fees of the blockchain network, is minimized.

Moreover, various embodiments of the present disclosure provide for the practical application of cross blockchain asset purchases. Previously, NFT marketplace services could only facilitate transactions of NFTs that were paid using the same cryptocurrency coin or token of the blockchain that hosted the NFT. For example, if an NFT were hosted on the ETHEREUM blockchain, previous marketplace services would have been limited to accepting payments in ETHEREUM. In contrast, various embodiments of the present disclosure provide for an NFT hosted on a first blockchain (e.g., ETHEREUM) to be purchased using a cryptocurrency token or coin of a second blockchain (e.g., BITCOIN).

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
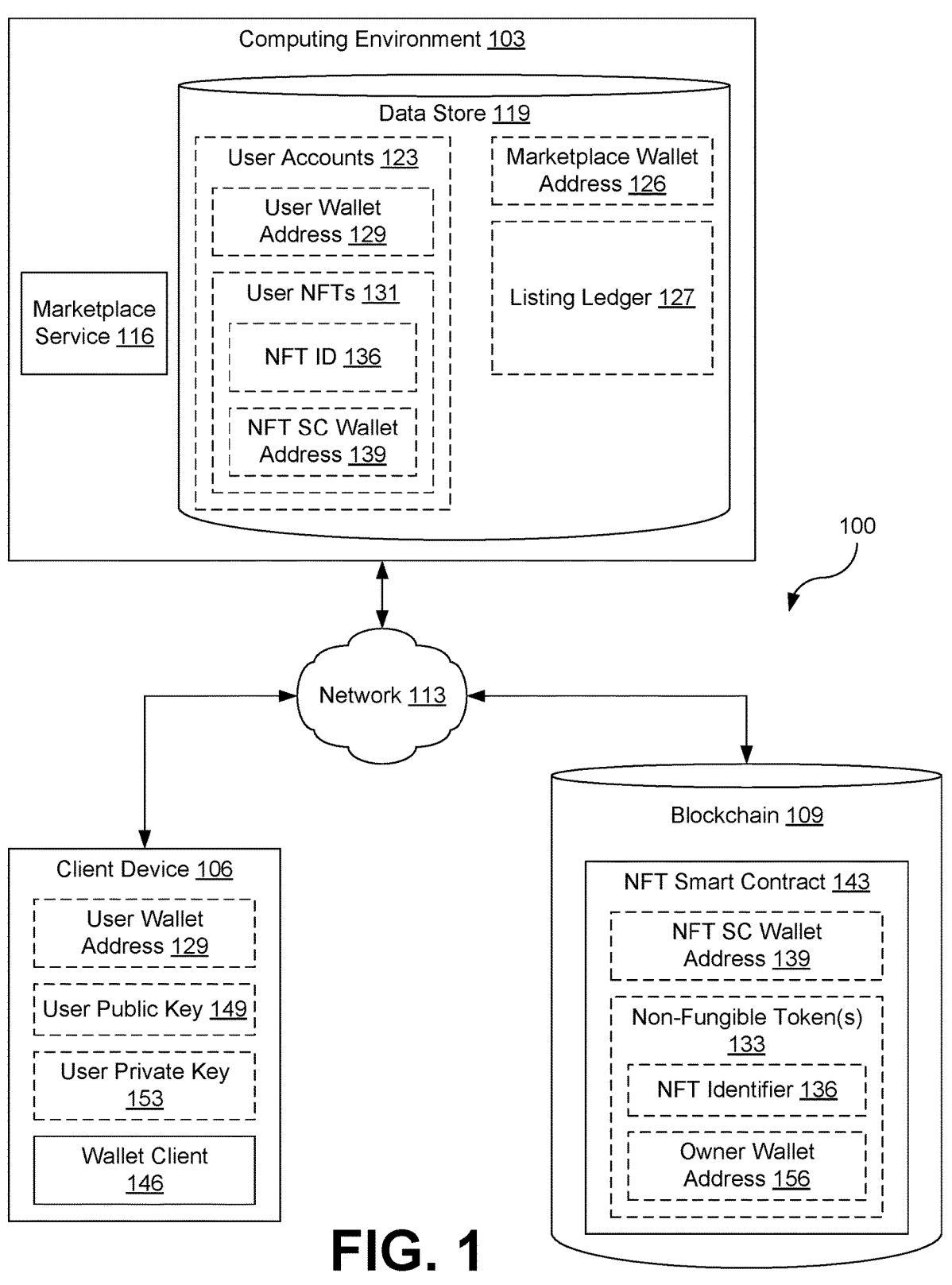
FIG. 1 is a drawing of a network environment according to various embodiments of the present disclosure.

With reference to FIG. 1, shown is a network environment 100 according to various embodiments. The network environment 100 can include a computing environment 103, one or more client devices 106, and a blockchain 109, which can be in data communication with each other via a network 113. Although FIG. 1 depicts a single blockchain 109 for the sake of simplicity, it is understood that multiple blockchains 109 could be connected to the network 113. In these implementations, cross blockchain asset purchases could be performed, with a user paying with cryptocurrency supported by a first blockchain 109 to acquire an NFT stored on a second blockchain 109. As an illustrative example, a user could make a purchase using ether on the ETHEREUM blockchain to acquire an NFT stored on the SOLANA blockchain or TEZOS blockchain.

The network 113 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 113 can also include a combination of two or more networks 113. Examples of networks 113 can include the Internet, intranets, extranets, virtual private networks (VPNs), and similar networks.

The computing environment 103 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 103 can employ a plurality of computing devices that can be arranged in one or more server banks or computer banks or other arrangements. Such computing devices can be located in a single installation or can be distributed among many different geographical locations. For example, the computing environment 103 can include a plurality of computing devices that together can include a hosted computing resource, a grid computing resource or any other distributed computing arrangement. In some cases, the computing environment 103 can correspond to an elastic computing resource where the allotted capacity of processing, network, storage, or other computing-related resources can vary over time.

Various applications or other functionality can be executed in the computing environment 103. The components executed on the computing environment 103 include a marketplace service 116, and other applications, services, processes, systems, engines, or functionality not discussed in detail herein.

Also, various data is stored in a data store 119 that is accessible to the computing environment 103. The data store 119 can be representative of a plurality of data stores 119, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the data store 119 is associated with the operation of the various applications or functional entities described below. This data can include user accounts 123, a marketplace wallet address 126, a listing ledger 127, and potentially other data.

A user account 123 can represent data associated with individual users of the marketplace service 116. Examples of a data that could be stored in a user account 123 can include a user wallet address 129, as well as one or more user NFTs 131.

The user wallet address 129 can represent a wallet address for a blockchain 109 that a user has demonstrated control or ownership of. The user wallet address 129 could be linked to the user account 123 to allow the marketplace service 116 to transfer cryptocurrency coins or tokens to a user or to identify when cryptocurrency coins or tokens have been received from the user. A user account 123 can have multiple user wallet addresses 129 linked to or associated with the user account 123. For example, the user account 123 could have separate user wallet addresses 129 for separate blockchains 109 (e.g., an ETHEREUM address, a SOLANA address, a BITCOIN address, etc.) or multiple user wallet addresses 129 for the same blockchain 109 (e.g., multiple ETHEREUM addresses).

The user NFTs 131 can represent one or more non-fungible tokens 133 owned by the user. This could include NFTs 133 that are self-custodied by the user (e.g., owned by the user wallet address 129), or NFTs 133 that are custodied by the marketplace service 116 on behalf of the user. Accordingly, each user NFT 131 can include an NFT identifier 136 and an NFT smart contract 143 address 139.

The NFT identifier 136 uniquely identifies an individual NFT 133 with respect to other NFTs 133 minted or maintained by an NFT smart contract 143. The NFT smart contract 143 wallet address 139 represents a unique identifier for the NFT smart contract 143, which is derived from the public key of the public-private key pair of the NFT smart contract 143.

The marketplace wallet address 126 can represent a wallet address for a blockchain 109 owned or controlled by the marketplace service 116. The marketplace wallet address 126 can be used by the marketplace service 116 to transfer cryptocurrency coins or tokens to other individuals or entities or receive cryptocurrency coins or tokens from other individuals or entities. Moreover, the marketplace service 116 can have multiple marketplace wallet addresses 126. For example, the marketplace service 116 could maintain separate marketplace wallet addresses 126 for separate blockchains 109 (e.g., an ETHEREUM address, a SOLANA address, a BITCOIN address, etc.) or multiple marketplace wallet addresses 126 for the same blockchain 109 (e.g., multiple ETHEREUM addresses).

The listing ledger 127 can be used to store information about transactions facilitated by the marketplace service 116. For example, the amount of purchase cryptocurrency coins or tokens received from a purchaser of an NFT 133 could be stored in the listing ledger 127, as well as the NFT identifier 136 and NFT smart contract wallet address 139 to uniquely identify the NFT 133 purchased. Other information about a transaction, such as a user wallet address 129 in which the seller of the NFT 133 is to receive cryptocurrency coins or tokens, a minimum or initial bid for the NFT 133, etc. could also be stored in the listing ledger 127. Entries in the listing ledger 127 could, for example, be created at the time that a seller of an NFT 133 lists an NFT 133 for sale through the marketplace service 116. When the purchase cryptocurrency coins or tokens are stored on a first blockchain 109a, but the NFT 133 is stored on a second blockchain 109b, an entry in the listing ledger 127 could also identify which blockchain 109a is to be used for the purchase, and which blockchain 109b hosts the NFT 133. However, in many instances, each blockchain 109 has a unique address format, such that the identity of the blockchain 109a that the purchase cryptocurrency coins or tokens are stored on and/or the identity of the blockchain 109b that the NFT 133 is stored on can be deduced of inferred from the format of the user wallet address 129 and/or the NFT smart contract wallet address 139.

The marketplace service 116 can be executed to facilitate the acquisition and/or transfer of user NFTs 131. For example, the marketplace service 116 could provide one or more web pages that allow users to view user NFTs 131 available for purchase, on auction, or that are currently owned by other users. The marketplace service 116 can also provide user specific services, such as assisting in the management, curation, or display of the collected user NFTs 131 of individual users. As part of these services, the marketplace service 116 could provide user profile pages that allow for a user to see or view the user NFTs 131 associated with his or her account.

The client device 106 is representative of a plurality of client devices that can be coupled to the network 113. The client device 106 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 106 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 106 or can be connected to the client device 106 through a wired or wireless connection.

The client device 106 can be configured to execute various applications, such as a wallet client 146. Various data can also be stored on the client device 106, such as a user wallet address 129, a user public key 149, a respective user private key 153 for the user public key 149, and potentially other data.

The wallet client 146 can be executed to allow the client device 106 to interact with the nodes of the blockchain 109. The wallet client 146 can be executed to send cryptocurrency coins or tokens from the user wallet address 129 to a specified wallet address, to view the amount of cryptocurrency coins or tokens that the blockchain 109 has recorded as being associated with the user wallet address 129, or to sign transactions associated with the user wallet address 129 using the user private key 153. Examples of wallet clients 146 include METAMASK, EXODUS Wallet, etc.

The blockchain 109 can represent an immutable, append only, eventually consistent distributed data store formed from a plurality of nodes that maintain duplicate copies of data stored in the blockchain 109. The nodes of the blockchain 109 can use a variety of consensus protocols to coordinate the writing of data written to the blockchain. In order to store data to the blockchain 109, such as a record of a transaction of cryptocurrency coins or tokens between wallet addresses, users can pay cryptocurrency coins or tokens to one or more of the nodes of the blockchain 109. Examples of blockchains 109 include the BITCOIN network, the ETHEREUM network, the SOLANA network, etc.

In some implementations, smart contracts can be stored on the blockchain. A smart contract can represent executable computer code that can be executed by a node of the blockchain 109. In many implementations, the smart contract can expose one or more functions that can be called by any user or by a limited set of users. To execute one or more functions of a smart contract, an application can submit a request to a node of the blockchain to execute the function. The node can then execute the function and store the result to the blockchain 109. Nodes may charge fees in the form of cryptocurrency coins or tokens to execute a function and store the output, with more complicated or extensive functions requiring larger fees. An example of this implementation is the ETHEREUM blockchain, where users can pay fees, referred to as "gas," in order to have a node of the ETHEREUM execute the function and store the result to the ETHEREUM blockchain. The more "gas" a user pays, the more quickly the function will be executed and its results committed to the blockchain 109.

For example, an NFT smart contract 143 could be stored on the blockchain 109. The NFT smart contract 143 could include an NFT smart contract wallet address 139, and the functions provided by the NFT smart contract 143 could be executed to allow users to mint or create non-fungible tokens 133. Once minted, other functions provided by the NFT smart contract 143 could be executed to update the current owner of the NFT 133, as reflected by the owner wallet address 156. The owner wallet address 156 can represent the user wallet address 129 of the current owner of the NFT 133, if the NFT 133 is self-custodied, or it could represent the marketplace wallet address 126, if the NFT 133 is custodied by the marketplace service 116.

Next, a general description of the operation of the various components of the network environment 100 is provided. Although the following description describes an example of the interactions between the various embodiments of the present disclosure, other sequences of interactions are also encompassed by the various embodiments of the present disclosure.

To begin, the marketplace service 116 receives information about an NFT 133 to list for sale, which can be stored in the listing ledger 127. This can include the owner wallet address 156, the NFT smart contract 143 and/or NFT smart contract wallet address 139, the NFT identifier 136, and/or a user wallet address 129 (including which blockchain 109 the user wallet address 129 is located on, such as ETHEREUM, TEZOS, SOLANA, etc.) where funds can be deposited upon the sale of the NFT 133. After verifying the listing, the marketplace service 116 can create the listing and offer the NFT 133 for sale. However, the NFT 133 remains associated with, and therefore under the control of, the owner wallet address 156. Once the marketplace service 116 receives cryptocurrency coins or tokens from a purchaser, the marketplace service 116 can transfer the ownership of the NFT 133 to the purchaser. The marketplace service 116 can then transfer the purchased cryptocurrency coins or tokens to the user wallet address 129 of the seller. As previously noted, the funds can be transferred from the user wallet address 129 of the purchaser to the marketplace wallet address 126 of the marketplace service at the time of purchase. This allows for the purchaser to use funds under his or her direct control to make the purchase, without the marketplace service 116 having to hold the funds on deposit.

Figure 2A:
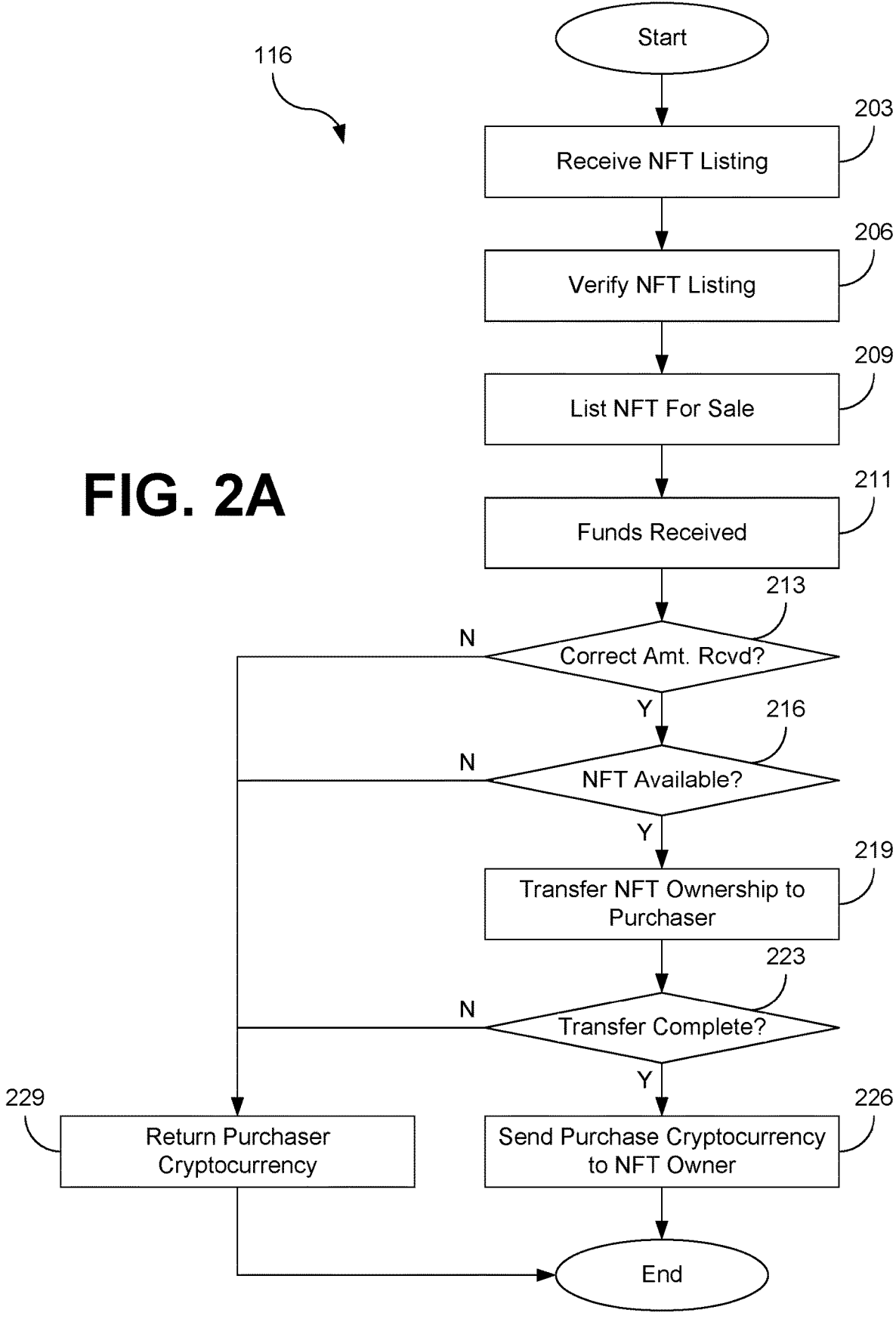
FIG. 2A is a flowchart illustrating one example of functionality implemented as portions of an application executed in a computing environment in the network environment of FIG. 1 according to various embodiments of the present disclosure.

Referring next to FIG. 2A, shown is a flowchart that provides one example of the operation of a portion of the marketplace service 116. The flowchart of FIG. 2A provides merely an example of the many different types of functional arrangements that can be employed to implement the operation of the depicted portion of the marketplace service 116. As an alternative, the flowchart of FIG. 2A can be viewed as depicting an example of elements of a method implemented within the network environment 100.

Beginning with block 203, the marketplace service 116 can receive a request to list a self-custodied NFT 133 for sale through the marketplace service 116. The request could be received from a client device 106 owned or operated by the owner of the NFT 133. The request could include the NFT smart contract address 139 and NFT identifier 136, the combination of which can act as a tuple that uniquely identifies the NFT 133 within the blockchain 109. The request could also include additional information, such as a user wallet address 129 of the seller to which cryptocurrency coins or tokens are to be deposited. This wallet address could be the same as the user wallet address 129 specified as the owner wallet address 156 of the NFT 133 or a second user wallet address 129 (e.g., a separate or segregated wallet address to hold the proceeds of the sale of NFTs 133). The marketplace service 116 could store this information in the listing ledger 127.

It should be noted that various embodiments of the present disclosure permit for cross-chain purchases of NFTs 133. For example, the listing received at block 203 could specify an NFT smart contract address 139 on a first blockchain 109 (e.g., ETHEREUM), but specify that payment is to be made using a cryptocurrency coin or token of a second blockchain 109 (e.g., BITCOIN). In these embodiments, the listing could further identify the blockchain 109 to be used for purchasing the NFT 133 to be listed for sale and the user wallet address 129 of the second blockchain 109.

Then, at block 206, the marketplace service 116 can verify the listing received at block 203. For example, the marketplace service 116 could send a cryptographic challenge to the user or client device 106 that submitted the listing at block 203. The challenge could be encrypted using the user public key 149 of the user wallet address 129 specified by the NFT 133 as the owner wallet address 156. If the unencrypted challenge is received in combination with a signature generated by the user private key 153, then the marketplace service 116 can conclude that the listing is valid. The signature can be verified by the marketplace service 116 using the user public key 149.

Moving on to block 209, the marketplace service 116 can list the NFT 133 for sale. This could include creating a webpage listing the NFT 133, the asking price for the NFT 133, and providing one or more options for an individual to purchase the NFT 133 using the specified cryptocurrency. The marketplace service 116 could also add the NFT 133 listed for sale to the user NFTs 131 associated with the user account 123 of the seller. Once listed, the marketplace service 116 could receive an offer to purchase the NFT 133, which could be accepted according to one or more seller specified criteria (e.g., highest bid at the close of an auction or bidding period, first offer matching a specified purchase price, etc.).

Once the NFT 133 is sold to a purchaser, then the process can proceed to block 211, where the marketplace service 166 receives funds for the NFT in the form of cryptocurrency coins or tokens. Funds could be received through various approaches. For example, the marketplace service 116 could have provided a unique transaction identifier to the purchaser of the NFT 133, which the purchaser could use to flag a purchase when transferring cryptocurrency coins or tokens to the marketplace wallet address 126. As another example, the marketplace service 116 could have generated a unique marketplace wallet address 126 to which the purchaser could transfer the amount of cryptocurrency coins or tokens required to purchase the listed NFT 133.

In response to receipt of the cryptocurrency coins or tokens at block 211, the marketplace service 116 can determine at block 213 whether the correct amount of purchase funds have been received. This can be done through several approaches.

For example, the marketplace service 116 could have provided a unique transaction identifier to the purchaser of the NFT 133. The purchaser could then include the unique transaction identifier in the transfer of the purchase amount of cryptocurrency coins or tokens from the user wallet address 129 of the purchaser to the marketplace wallet address 126 of the marketplace service 116, where the funds will be temporarily held in escrow. When the marketplace service 116 detects that a transaction recorded to the blockchain 109 specifies both the unique transaction identifier and the requisite purchase amount of cryptocurrency coins or token, then the marketplace service 116 could determine that the correct amount of funds have been received.

As another example, the marketplace service 116 could have generated a unique marketplace wallet address 126 to which the purchaser could transfer the amount of cryptocurrency coins or tokens required to purchase the listed NFT 133. Once the marketplace service 116 detects that requisite purchase amount of cryptocurrency coins or token have been transferred to the unique marketplace wallet address 126, then the marketplace service 116 could determine that the correct amount of funds have been received.

If the correct amount of purchase funds is received, then the process can proceed to block 216. However, if the correct amount of funds is not received, then the process could either halt until additional funds are deposited or the process could alternatively proceed to block 229.

Referring next to block 216, the marketplace service 116 can optionally determine if the NFT 133 listed for sale is still available. This could be done to insure that the NFT 133 listed for sale was not sold or transferred to another party (e.g., because it was listed for sale on multiple marketplaces). This functionality may be performed in order to avoid incurring transaction fees associated with a failed transfer of the NFT 133 to the purchaser if the process were to proceed to block 219. Alternatively, the marketplace service 116 could attempt to transfer ownership of the NFT 133 to the purchaser, with an error or failure indicating that the NFT 133 is no longer available. If the marketplace service 116 determines that the NFT 133 is no longer available, then the process can proceed to block 229. However, if the NFT 133 remains available, then the process can proceed to block 219.

Next, at block 219, the marketplace service 116 can transfer the ownership of the list NFT 133 from the seller to the purchaser. For example, the marketplace service 116 could invoke a function provided by the NFT smart contract 143 that manages the NFT 133 to update the owner wallet address 156 to reflect the user wallet address 129 of the purchaser.

Then, at block 223, the marketplace service 116 can determine whether the transfer of the NFT 133 to the purchaser successfully completed. This could be done using a variety of approaches. The success or failure of the transfer could, for example, be indicated by the return value or code of the transfer function invoked at block 219. Alternatively, or additionally, the marketplace service 116 could execute or invoke a function provided by the NFT smart contract 143 that provides the owner wallet address 156 for a specified NFT identifier 136. If the transfer is successful, then the process can proceed to block 226. If the transfer failed (e.g., because an earlier submitted or a higher priority request to transfer the NFT 133 were recorded to the blockchain 109), then process would proceed to block 229.

Subsequently, at block 226, the marketplace service 116 can send the purchase cryptocurrency coins or tokens received at block 213 to the wallet address specified by the seller of the NFT 133 at block 203. As previously noted, cryptocurrency coins or tokens, and the wallet address specified by the seller, can be on a second, separate blockchain 109 from the first blockchain that hosts the NFT 133 that was sold. For example, the marketplace service 116 could search the listing ledger 127 for the record of the amount of purchase cryptocurrency coins or tokens received and send a respective amount of purchase cryptocurrency coins or tokens to the wallet address specified by the seller of the NFT 133.

However, if the process proceeds to block 229, then the marketplace service 116 could return the cryptocurrency coins or tokens to the purchaser. This could be done to refund the purchaser to compensate the purchaser for the failed transaction.

The process depicted by the flowchart of FIG. 2A minimizes the blockchain 109 transaction fees paid by the parties of the transaction. Applicant notes that blockchain 109 transaction fees (e.g., ETHEREUM gas) are paid by the purchaser at block 211, when the purchaser transfers funds to the marketplace service to purchase the NFT 133. Blockchain 109 transaction fees are also paid by the marketplace service 116 at block 219 when the transfer function of the NFT smart contract 143 is invoked. Finally, the marketplace service 116 pays blockchain 109 transaction fees again at block 226 when the funds held in escrow with the marketplace wallet address 126 are transferred to the seller of the NFT 133. In contrast, decentralized finance (DeFi) marketplaces would execute the functionality of each block using a smart contract. As a result, transaction fees would be paid by one of the parties at each step of the transaction.

Moreover, the process depicted by the flowchart of FIG. 2A allows users to make purchases or sell self-custodied NFTs 133 (e.g., ownership and control of the NFT remains in the hands of the seller throughout the process) using self-custodied funds (e.g., the purchase is made using funds directly under the ownership and control of the purchaser). As a result, purchasers and sellers are able to maintain control of their cryptocurrency coins or tokens, including NFTs 133, instead of placing them in the custody of a third-party (e.g., the marketplace service) in order to complete the transaction. In contrast, some marketplaces often require users to transfer their cryptocurrency coins or tokens, including NFTs 133, to a wallet owned or controlled by the marketplace. Although these implementations allow for even greater savings on blockchain 109 fees (e.g., ETHEREUM gas fees), the users no longer have control or ownership of their cryptocurrency coins or tokens, and are relying on the marketplace to be both secure and trustworthy.

Figure 2B:
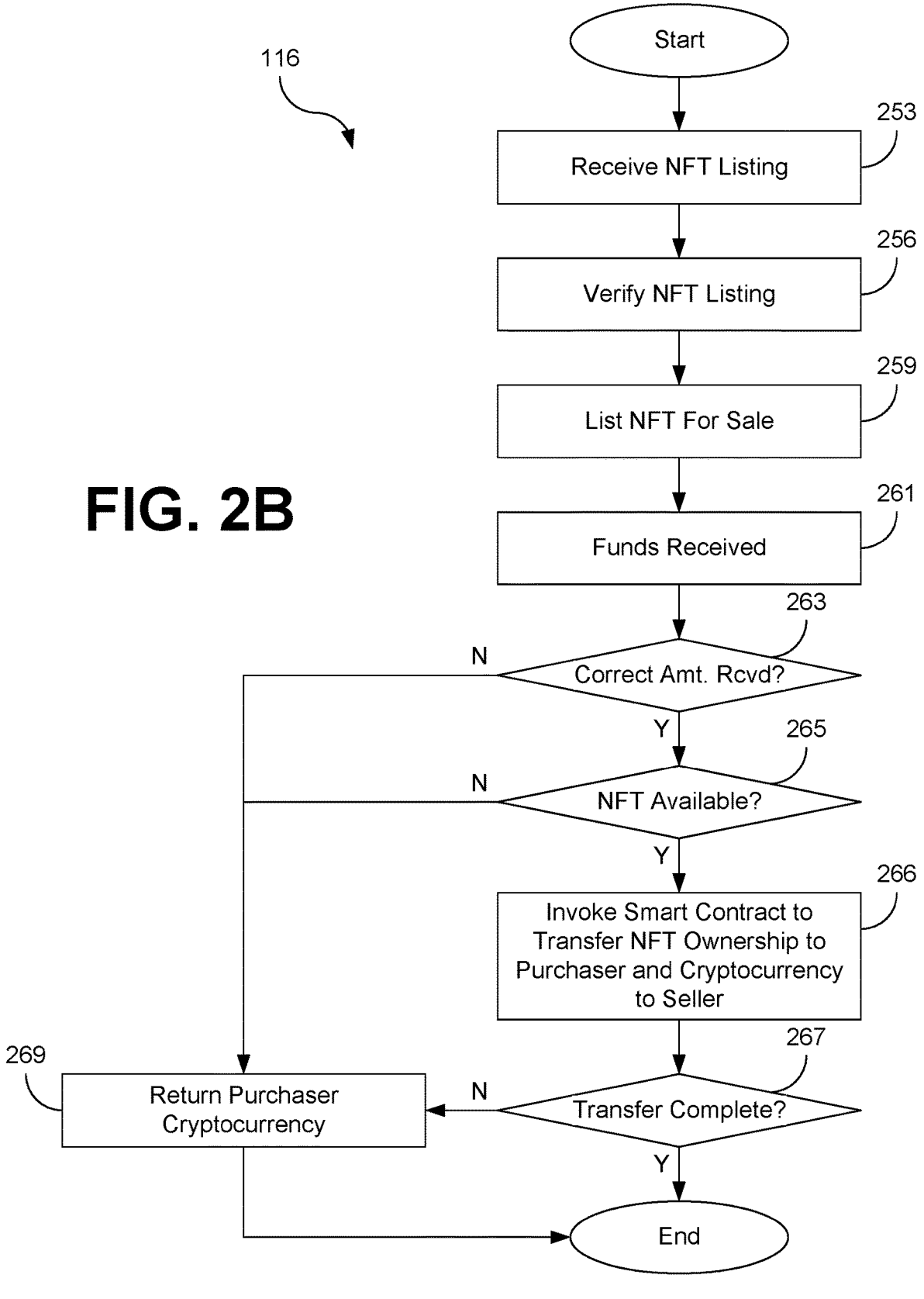
FIG. 2B is a flowchart illustrating one example of functionality implemented as portions of an application executed in a computing environment in the network environment of FIG. 1 according to various embodiments of the present disclosure.

Referring next to FIG. 2B, shown is a flowchart that provides an alternative example of the operation of a portion of the marketplace service 116. The flowchart of FIG. 2B provides merely an example of the many different types of functional arrangements that can be employed to implement the operation of the depicted portion of the marketplace service 116. As an alternative, the flowchart of FIG. 2B can be viewed as depicting an example of elements of a method implemented within the network environment 100.

Beginning with block 253, the marketplace service 116 can receive a request to list a self-custodied NFT 133 for sale through the marketplace service 116. The request could be received from a client device 106 owned or operated by the owner of the NFT 133. The request could include the NFT smart contract address 139 and NFT identifier 136, the combination of which can act as a tuple that uniquely identifies the NFT 133 within the blockchain 109. The request could also include additional information, such as a user wallet address 129 of the seller to which cryptocurrency coins or tokens are to be deposited. This wallet address could be the same as the user wallet address 129 specified as the owner wallet address 156 of the NFT 133 or a second user wallet address 129 (e.g., a separate or segregated wallet address to hold the proceeds of the sale of NFTs 133). The marketplace service 116 could store this information in the listing ledger 127.

Then, at block 256, the marketplace service 116 can verify the listing received at block 253. For example, the marketplace service 116 could send a cryptographic challenge to the user or client device 106 that submitted the listing at block 253. The challenge could be encrypted using the user public key 149 of the user wallet address 129 specified by the NFT 133 as the owner wallet address 156. If the unencrypted challenge is received in combination with a signature generated by the user private key 153, then the marketplace service 116 can conclude that the listing is valid. The signature can be verified by the marketplace service 116 using the user public key 149.

Moving on to block 259, the marketplace service 116 can list the NFT 133 for sale. This could include creating a webpage listing the NFT 133, the asking price for the NFT 133, and providing one or more options for an individual to purchase the NFT 133 using the specified cryptocurrency. The marketplace service 116 could also add the NFT 133 listed for sale to the user NFTs 131 associated with the user account 123 of the seller. Once listed, the marketplace service 116 could receive an offer to purchase the NFT 133, which could be accepted according to one or more seller specified criteria (e.g., highest bid at the close of an auction or bidding period, first offer matching a specified purchase price, etc.).

Once the NFT 133 is sold to a purchaser, then the process can proceed to block 261, where the marketplace service 166 receives funds for the NFT in the form of cryptocurrency coins or tokens. Funds could be received through various approaches. For example, the marketplace service 116 could have provided a unique transaction identifier to the purchaser of the NFT 133, which the purchaser could use to flag a purchase when transferring cryptocurrency coins or tokens to the marketplace wallet address 126. As another example, the marketplace service 116 could have generated a unique marketplace wallet address 126 to which the purchaser could transfer the amount of cryptocurrency coins or tokens required to purchase the listed NFT 133.

In response to receipt of the cryptocurrency coins or tokens at block 261, the marketplace service 116 can determine at block 263 whether the correct amount of purchase funds have been received. This can be done through several approaches.

For example, the marketplace service 116 could have provided a unique transaction identifier to the purchaser of the NFT 133. The purchaser could then include the unique transaction identifier in the transfer of the purchase amount of cryptocurrency coins or tokens from the user wallet address 129 of the purchaser to the marketplace wallet address 126 of the marketplace service 116, where the funds will be temporarily held in escrow. When the marketplace service 116 detects that a transaction recorded to the blockchain 109 specifies both the unique transaction identifier and the requisite purchase amount of cryptocurrency coins or token, then the marketplace service 116 could determine that the correct amount of funds have been received.

As another example, the marketplace service 116 could have generated a unique marketplace wallet address 126 to which the purchaser could transfer the amount of cryptocurrency coins or tokens required to purchase the listed NFT 133. Once the marketplace service 116 detects that requisite purchase amount of cryptocurrency coins or token have been transferred to the unique marketplace wallet address 126, then the marketplace service 116 could determine that the correct amount of funds have been received.

If the correct amount of purchase funds is received, then the process can proceed to block 265. However, if the correct amount of funds is not received, then the process could either halt until additional funds are deposited or the process could alternatively proceed to block 269.

Moving to block 265, the marketplace service 116 can optionally determine if the NFT 133 listed for sale is still available. This could be done to insure that the NFT 133 listed for sale was not sold or transferred to another party (e.g., because it was listed for sale on multiple marketplaces). This functionality may be performed in order to avoid incurring transaction fees associated with a failed transfer of the NFT 133 to the purchaser if the process were to proceed to block 266. Alternatively, the marketplace service 116 could attempt to transfer ownership of the NFT 133 to the purchaser, with an error or failure indicating that the NFT 133 is no longer available. If the marketplace service 116 determines that the NFT 133 is no longer available, then the process can proceed to block 269. However, if the NFT 133 remains available, then the process can proceed to block 266.

Referring next to block 266, the marketplace service 116 can invoke a transfer function provided the NFT smart contract 143 to cause ownership of the listed NFT 133 to be transferred from the seller to the purchaser. For example, the marketplace service 116 could invoke a function provided by the NFT smart contract 143 that manages the NFT 133 to update the owner wallet address 156 to reflect the user wallet address 129 of the purchaser. Arguments for the function could include the NFT identifier 136 of the NFT 133 to be transferred, the user wallet address 129 of the purchaser, etc. Invocation of the function could also cause the cryptocurrency received from the purchaser to be transferred from marketplace wallet address 126 to the NFT smart contract wallet address ###. The NFT smart contract 143 could then perform the operations of confirming that the NFT 133 is still available, update the owner wallet address 156 to reflect the user wallet address 129 of the purchaser, and then transfer the received cryptocurrency to the wallet address specified for the seller of the NFT 133.

Then, at block 267, the marketplace service 116 can determine whether the transfer of the NFT 133 to the purchaser successfully completed. This could be done using a variety of approaches. The success or failure of the transfer could, for example, be indicated by the return value or code of the transfer function invoked at block 266. Alternatively, or additionally, the marketplace service 116 could execute or invoke a function provided by the NFT smart contract 143 that provides the owner wallet address 156 for a specified NFT identifier 136. If the transfer is successful, then the process can end. If the transfer failed (e.g., because an earlier submitted or a higher priority request to transfer the NFT 133 were recorded to the blockchain 109), then process would proceed to block 269.

However, if the process proceeds to block 269, then the marketplace service 116 could return the cryptocurrency coins or tokens to the purchaser. This could be done to refund the purchaser to compensate the purchaser for the failed transaction. However, in some implementations, the marketplace service 116 could instead wait to receive additional cryptocurrency funds or tokens sufficient to purchase the NFT 133. Once received, the marketplace service 116 could then proceed to block 266 to consummate the purchase of the NFT 133.

The process depicted by the flowchart of FIG. 2B minimizes the blockchain 109 transaction fees paid by the parties of the transaction. Applicant notes that blockchain 109 transaction fees (e.g., ETHEREUM gas) are paid by the purchaser at block 261, when the purchaser transfers funds to the marketplace service to purchase the NFT 133. Blockchain 109 transaction fees are also paid by the marketplace service 116 at block 266 when the transfer function of the NFT smart contract 143 is invoked. By combining multiple operations into a single transaction at block 266, the blockchain 109 transaction fees can be further minimized compared to the process depicted in FIG. 2A. In contrast, decentralized finance (DeFi) marketplaces would execute the functionality of each block using a smart contract. As a result, transaction fees would be paid by one of the parties at each step of the transaction.

Moreover, the process depicted by the flowchart of FIG. 2B allows users to make purchases or sell self-custodied NFTs 133 (e.g., ownership and control of the NFT remains in the hands of the seller throughout the process) using self-custodied funds (e.g., the purchase is made using funds directly under the ownership and control of the purchaser). As a result, purchasers and sellers are able to maintain control of their cryptocurrency coins or tokens, including NFTs 133, instead of placing them in the custody of a third-party (e.g., the marketplace service) in order to complete the transaction. In contrast, some marketplaces often require users to transfer their cryptocurrency coins or tokens, including NFTs 133, to a wallet owned or controlled by the marketplace. Although these implementations allow for even greater savings on blockchain 109 fees (e.g., ETHEREUM gas fees), the users no longer have control or ownership of their cryptocurrency coins or tokens, and are relying on the marketplace to be both secure and trustworthy.

Figure 3A:
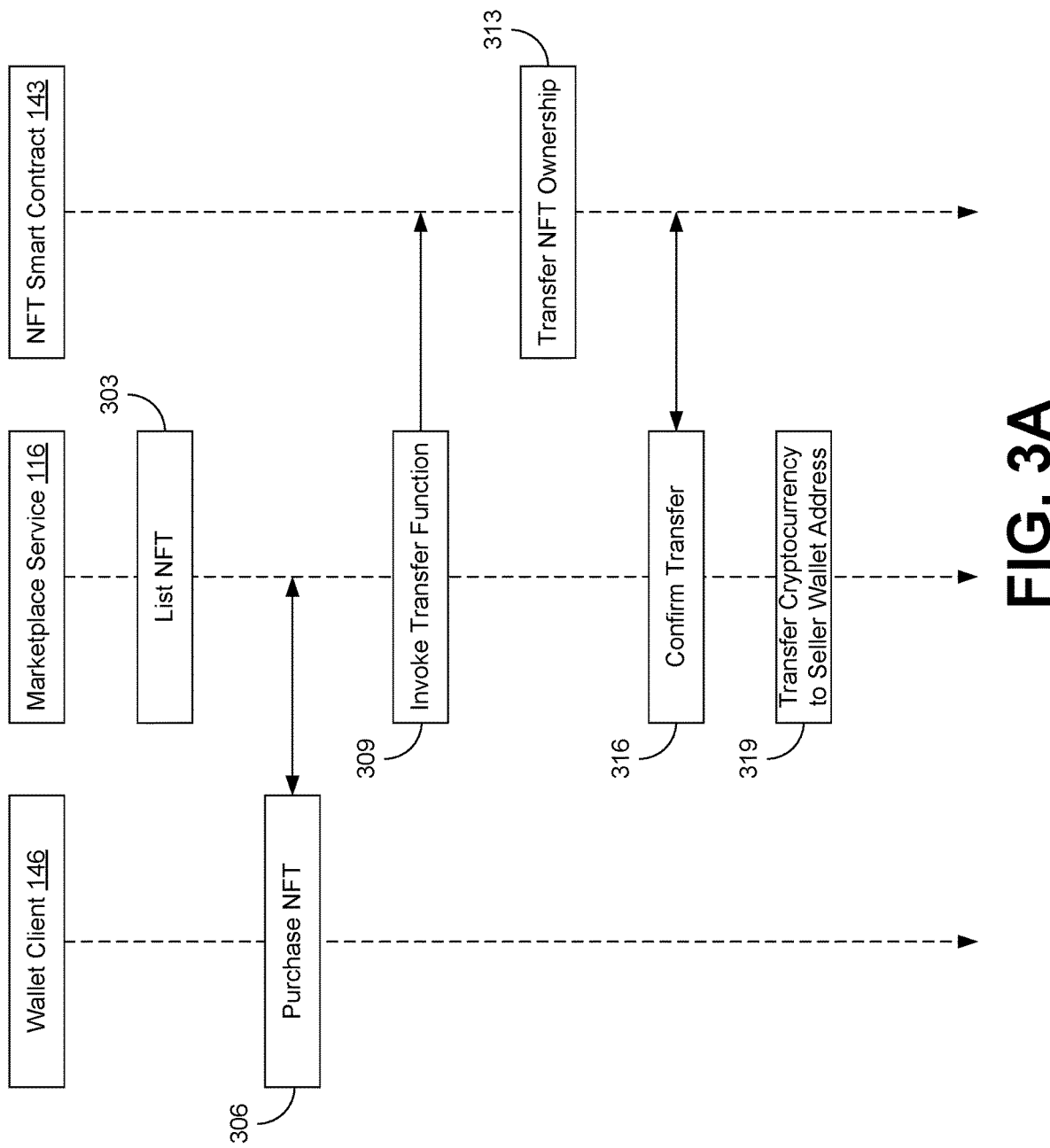
FIG. 3A is a sequence diagram illustrating an example of the interactions between the applications executed in the network environment of FIG. 1 according to various embodiments of the present disclosure.

FIG. 3A is a sequence diagram depicting the interactions between the various components of the network environment 100 according to various embodiments of the present disclosure, such as those depicted in FIG. 1 and FIG. 2A. The sequence diagram of FIG. 3A is intended to clarify how the marketplace service 116 interacts with the other components of the network environment 100. As an alternative, the sequence diagram of FIG. 3A can be viewed as depicting an example of elements of a method implemented within the network environment 100.

Beginning at block 303, the marketplace service 116 can list an NFT 133 for sale. This could include creating a webpage listing the NFT 133, the asking price for the NFT 133, and providing one or more options for an individual to purchase the NFT 133 using the specified cryptocurrency. The marketplace service 116 could also add the NFT 133 listed for sale to the user NFTs 131 associated with the user account 123 of the seller. Once listed, the marketplace service 116 could receive an offer to purchase the NFT 133, which could be accepted according to one or more seller specified criteria (e.g., highest bid at the close of an auction or bidding period, first offer matching a specified purchase price, etc.).

Then, at block 306, the wallet client 146 can purchase the NFT 133 through the marketplace service 116. For example, in response to having an offer for sale be accepted by the marketplace service 116, the wallet client 146 could transfer a specified or accepted amount of cryptocurrency coins from the user wallet address 129 of the purchaser to the marketplace wallet address 126 to be held in escrow by the marketplace service 116. The purchaser of the NFT 133 may be required to pay network or gas fees on the blockchain 109 associated with the transfer of the cryptocurrency from the user wallet address 129 of the purchaser to the marketplace wallet address 126. As part of the purchase, the user's wallet client 146 could also specify a second user wallet address 129 that could be used for the purposes of taking ownership of the NFT 133 maintained by the NFT smart contract 143.

Subsequently, at block 309, the marketplace service 116 can cause ownership of the NFT 133 to be transferred from the seller of the NFT 133 to the purchaser of the NFT 133. For example, the marketplace service 116 could invoke or call a function provided by the NFT smart contract 143 that allows delegated or approved third parties (e.g., the marketplace service 116) to transfer ownership of the NFT 133 by updating the owner wallet address 156 of the NFT 133 with the user wallet address 129 of the purchaser. As part of calling the function, the marketplace service 116 could provide the user wallet address 129 of the purchaser of the NFT 133, which may be the same as the user wallet address 129 that was the source of the cryptocurrency coins or tokens used for the purchase or could be a second, separate user wallet address 129 that was specified at the time of purchase.

Proceeding to block 313, the NFT smart contract 143 can cause the ownership of the NFT 133 to be transferred in response to the marketplace service 116 invoking the transfer function. This could include the NFT smart contract 143 updating the owner wallet address 156 of the NFT 133 to match the user wallet address 129 of the purchaser, which could have been specified as an argument in the call or invocation of the transfer function. The functionality implemented at this point could also require the payment of network or gas fees on the blockchain 109.

Then, at block 316, the marketplace service 116 can confirm that ownership of the NFT 133 has been transferred to the purchaser. For example, the marketplace service 116 could execute a function of the NFT smart contract 143 that returns the current owner wallet address 156 of the specified NFT 133. If the current owner wallet address 156 matches the specified user wallet address 129 of the purchaser, then the marketplace service 116 could conclude that ownership of the NFT 133 has been transferred to the purchaser.

Subsequently, at block 319, the marketplace service 116 can transfer to the seller of the NFT 133 the cryptocurrency coins or tokens (or equivalents thereof) received from the purchaser. If the cryptocurrency coins or tokens were received from a user wallet address 129 on a first blockchain 109, but the seller has listed a deposit wallet address to receive funds on a second blockchain 109, then the marketplace service 116 may exchange the coins or tokens of the first blockchain 109 for an appropriate amount of coins or tokens on the second blockchain 109. The exchanged coins or tokens could then be sent to the deposit wallet address of the seller.

As previously discussed in FIG. 2A, it should be noted that the wallet client 146 and the NFT smart contract 143 do not have to be located or stored on the same blockchain 109. For example, the wallet client 146 could transfer funds from a user wallet address 129 stored on a first blockchain 109 (e.g., ETHEREUM) to cause the marketplace service 116 to invoke the transfer function of an NFT smart contract 143 located on a second blockchain 109 (e.g., SOLANA).

Figure 3B:
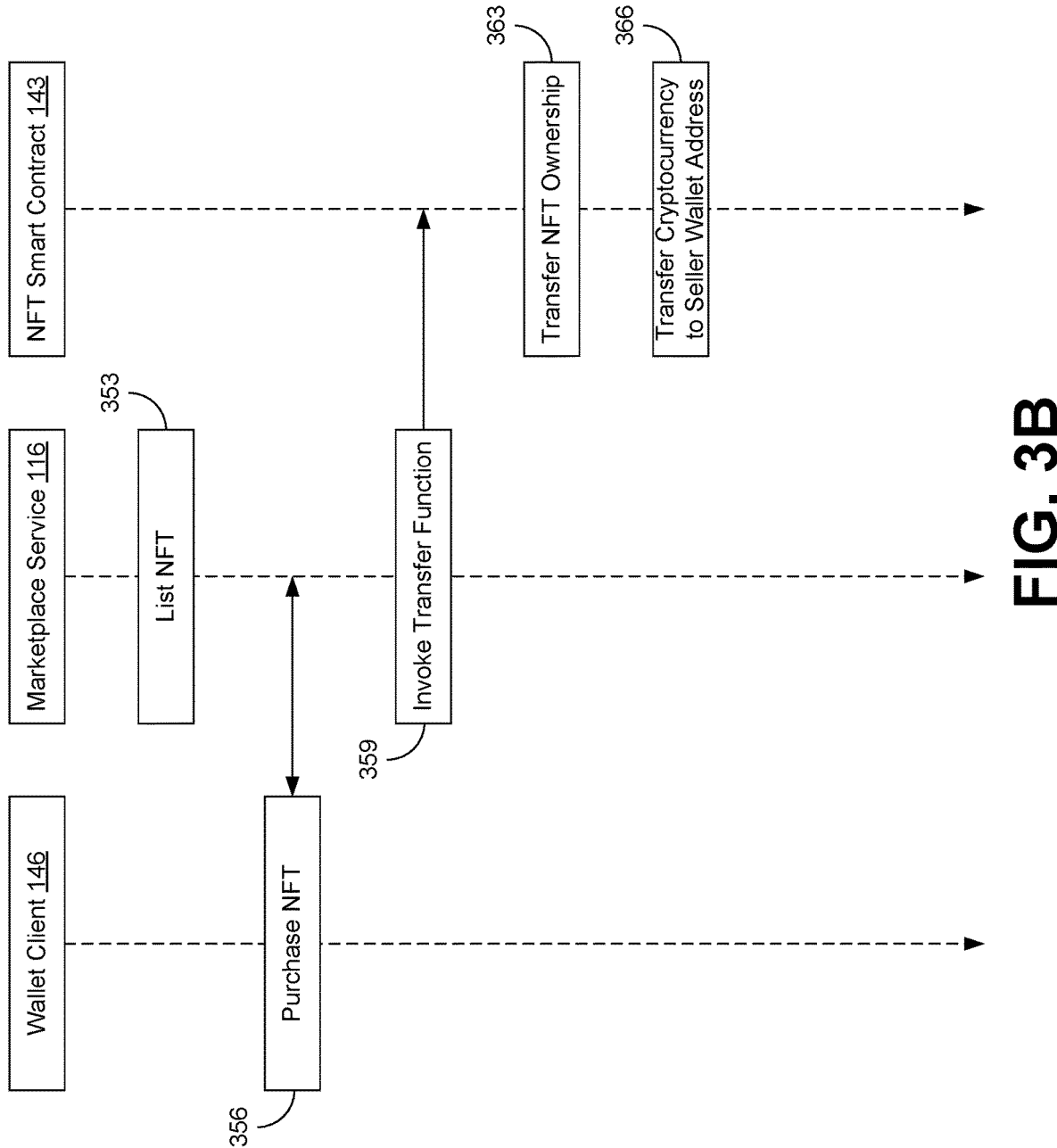
FIG. 3B is a sequence diagram illustrating an alternative example of the interactions between the applications executed in the network environment of FIG. 1 according to various embodiments of the present disclosure.

FIG. 3B is a sequence diagram depicting the interactions between the various components of the network environment 100 according to various embodiments of the present disclosure, such as those depicted in FIG. 1 and FIG. 2B. The sequence diagram of FIG. 3B is intended to clarify how the marketplace service 116 interacts with the other components of the network environment 100. As an alternative, the sequence diagram of FIG. 3B can be viewed as depicting an example of elements of a method implemented within the network environment 100.

Beginning at block 353, the marketplace service 116 can list an NFT 133 for sale. This could include creating a webpage listing the NFT 133, the asking price for the NFT 133, and providing one or more options for an individual to purchase the NFT 133 using the specified cryptocurrency. The marketplace service 116 could also add the NFT 133 listed for sale to the user NFTs 131 associated with the user account 123 of the seller. Once listed, the marketplace service 116 could receive an offer to purchase the NFT 133, which could be accepted according to one or more seller specified criteria (e.g., highest bid at the close of an auction or bidding period, first offer matching a specified purchase price, etc.).

Then, at block 356, the wallet client 146 can purchase the NFT 133 through the marketplace service 116. For example, in response to having an offer for sale be accepted by the marketplace service 116, the wallet client 146 could transfer a specified or accepted amount of cryptocurrency coins from the user wallet address 129 of the purchaser to the marketplace wallet address 126 to be held in escrow by the marketplace service 116. The purchaser of the NFT 133 may be required to pay network or gas fees on the blockchain 109 associated with the transfer of the cryptocurrency from the user wallet address 129 of the purchaser to the marketplace wallet address 126. As part of the purchase, the user's wallet client 146 could also specify a second user wallet address 129 that could be used for the purposes of taking ownership of the NFT 133 maintained by the NFT smart contract 143.

Subsequently, at block 359, the marketplace service 116 can cause ownership of the NFT 133 to be transferred from the seller of the NFT 133 to the purchaser of the NFT 133. For example, the marketplace service 116 could invoke or call a function provided by the NFT smart contract 143 that allows delegated or approved third parties (e.g., the marketplace service 116) to transfer ownership of the NFT 133 by updating the owner wallet address 156 of the NFT 133 with the user wallet address 129 of the purchaser. As part of calling the function, the marketplace service 116 could provide the user wallet address 129 of the purchaser of the NFT 133, which may be the same as the user wallet address 129 that was the source of the cryptocurrency coins or tokens used for the purchase or could be a second, separate user wallet address 129 that was specified at the time of purchase. The marketplace service 116 could also pay or provide the cryptocurrency coins or tokens received from the purchaser at block 356 to the NFT smart contract 143.

Proceeding to block 363, the NFT smart contract 143 can cause the ownership of the NFT 133 to be transferred in response to the marketplace service 116 invoking the transfer function. This could include the NFT smart contract 143 updating the owner wallet address 156 of the NFT 133 to match the user wallet address 129 of the purchaser, which could have been specified as an argument in the call or invocation of the transfer function. The functionality implemented at this point could also require the payment of network or gas fees on the blockchain 109.

Subsequently, at block 366, the NFT smart contract 143 can transfer to the seller of the NFT 133 the cryptocurrency coins or tokens (or equivalents thereof) received from the purchaser. For example, once the NFT smart contract 143 has updated the owner wallet address 156 to match the user wallet address 129 of the purchaser, the NFT smart contract 143 could then transfer the cryptocurrency coins or tokens received at block 359 to the wallet address of the previous owner (i.e., the seller) of the NFT 133.

Although separately depicted for clarity and illustrative purposes, the operations performed at blocks 363 and 366 could be combined into a single operation or set of operations to reduce the blockchain 109 transaction fees.

Figure 4A:
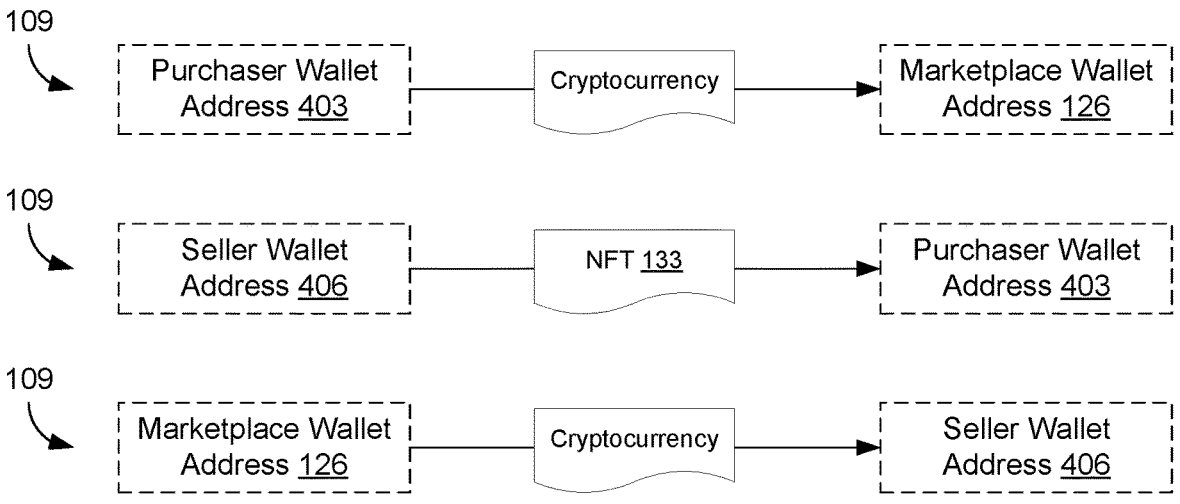
FIGS. 4A-4C are data flow diagrams illustrating the flow of cryptocurrency coins or tokens according to the various embodiments of the present disclosure.
Figure 4B:
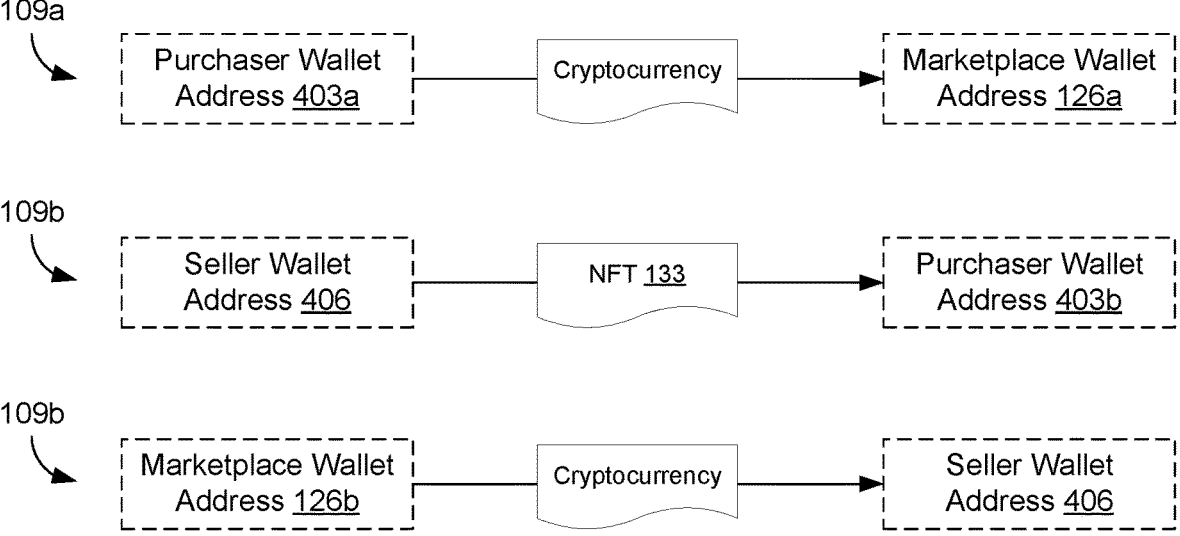
Figure 4C:
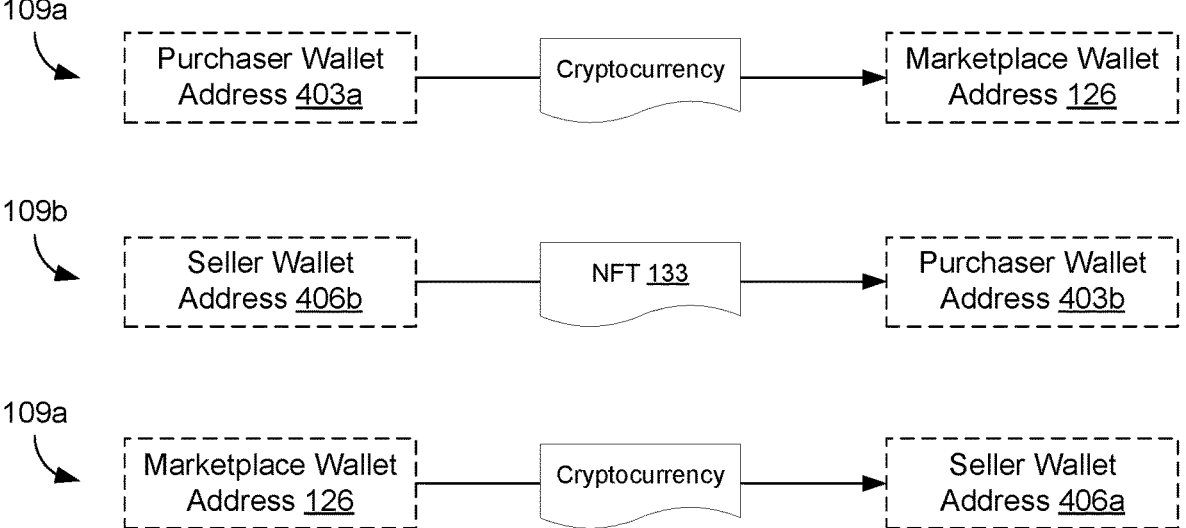

FIGS. 4A, 4B, and 4C are data flow diagrams that illustrate non-limiting examples of cryptocurrency tokens or coins, including NFTs 133, according to the various embodiments of the present disclosure.

FIG. 4A illustrates the flow of cryptocurrency tokens or coins, including NFTs 133, when an NFT 133 stored on a blockchain 109 is purchased with cryptocurrency coins or tokens on the same blockchain 109 using the previously described processes. As illustrated, the purchaser wallet address 403 and the seller wallet address 406 are user wallet addresses 129 for the purchaser and seller of the NFT 133, respectively. As shown in FIG. 4A, cryptocurrency coins or tokens are transferred from the purchaser wallet address 403 to the marketplace wallet address 126, as previously described and illustrated in FIGS. 1-3, where the cryptocurrency coins or tokens are held in escrow by marketplace service 116. An entry could be made in the listing ledger 127 to record the transfer of the cryptocurrency coins or tokens for the purchase of the NFT 133. Then, the marketplace service 116 can cause the NFT 133 to be transferred from the seller's wallet address 406 to the purchaser's wallet address 403, as previously described and illustrated in FIGS. 1-3. The NFT 133 to be transferred could be identified from a respective entry in the listing ledger 127. Then, the marketplace service 116 can transfer the cryptocurrency coins or tokens received from the purchaser to the seller by transferring the cryptocurrency coins or tokens from the marketplace wallet address 126 to the seller's wallet address 406, which could be determined from an entry in the listing ledger 127 for the transaction.

FIG. 4B illustrates an example of the flow of cryptocurrency tokens or coins, including NFTs 133, when cryptocurrency coins or tokens held by a purchaser on a first blockchain 109a are used to purchase an NFT 133 stored on a second blockchain 109b. As shown in FIG. 4B, cryptocurrency coins or tokens are transferred from the purchaser wallet address 403a to the marketplace wallet address 126a, as previously described and illustrated in FIGS. 1-3. An entry could be made in the listing ledger 127 to record the transfer of the cryptocurrency coins or tokens for the purchase of the NFT 133. As illustrated, the purchaser wallet address 403a references a user wallet address 129 on a first blockchain 109a, and the cryptocurrency coins or tokens are transferred from the purchaser wallet address 403a to a first marketplace wallet address 126a on the first blockchain 109a. The cryptocurrency coins or tokens can then be held in escrow by marketplace service 116.

Then, the marketplace service 116 can cause the NFT 133 stored on a second blockchain 109b to be transferred from the seller's wallet address 406 to the purchaser's wallet address 403b, as previously described and illustrated in FIGS. 1-3. The NFT 133 to be transferred could be identified from a respective entry in the listing ledger 127. As illustrated in FIG. 4B, the purchaser's wallet address 403b represents a second user wallet address 129 owned by the purchaser, but located on the second blockchain 109b. As previously mentioned in the discussion of FIGS. 1-3, when the purchaser wallet address 403a is located on a first blockchain 109a, and the seller wallet address 406 is located on a second blockchain 109b, the marketplace service 116 can exchange the cryptocurrency coins or tokens received on the first blockchain 109a for an equivalent amount of cryptocurrency coins or tokens on the second blockchain 109b. In other implementations, the marketplace service 116 can use a bridge to wrap the cryptocurrency coins or tokens received on the first blockchain 109a for an equivalent amount of wrapped cryptocurrency coins or tokens on the second blockchain 109b. Then, the marketplace service 116 can transfer the equivalent amount of cryptocurrency coins or tokens received from the purchaser to the seller by transferring the equivalent amount of cryptocurrency coins or tokens from the marketplace wallet address 126b on the second blockchain 109b to the seller's wallet address 406 on the second blockchain 109b, which could be determined from an entry in the listing ledger 127 for the transaction.

FIG. 4C illustrates another example of the flow of cryptocurrency tokens or coins, including NFTs 133, when cryptocurrency coins or tokens held by a purchaser on a first blockchain 109a are used to purchase an NFT 133 stored on a second blockchain 109b. As shown in FIG. 4C, cryptocurrency coins or tokens are transferred from the purchaser wallet address 403a to the marketplace wallet address 126, as previously described and illustrated in FIGS. 1-3. An entry could be made in the listing ledger 127 to record the transfer of the cryptocurrency coins or tokens for the purchase of the NFT 133. As illustrated, the purchaser wallet address 403a references a user wallet address 129 on a first blockchain 109a, and the cryptocurrency coins or tokens are transferred from the purchaser wallet address 403a to the marketplace wallet address 126 on the first blockchain 109a. The cryptocurrency coins or tokens can then be held in escrow by marketplace service 116.

Then, the marketplace service 116 can cause the NFT 133 stored on a second blockchain 109b to be transferred from the seller's wallet address 406b to the purchaser's wallet address 403b, as previously described and illustrated in FIGS. 1-3. The NFT 133 to be transferred could be identified from a respective entry in the listing ledger 127. As illustrated in FIG. 4C, the purchaser's wallet address 403b represents a second user wallet address 129 owned by the purchaser, but located on the second blockchain 109b. Likewise, the seller's wallet address 406b represents the user wallet address 129 of the seller that is located on the second blockchain 109b.

To complete the transaction, the marketplace service 116 can then cause the cryptocurrency coins or tokens held in escrow to be transferred from the market place wallet address 126 to the seller wallet address 406a, which represents another user wallet address 129 of the seller located on the first blockchain 109a, which could be determined from an entry in the listing ledger 127 for the transaction.

Although the previously described embodiments of the present disclosure discuss the purchase of NFTs 133 using cryptocurrency coins or tokens, these embodiments could also be used to facilitate the purchase of NFTs 133 using fiat currency issued by various central banks. In these situations, once the marketplace service 116 confirms that a sufficient amount of fiat currency has been received from the purchaser, an equivalent amount of cryptocurrency coins or tokens could be transferred to the owner or seller of the NFT 133. As part of the payment of fiat currency, the purchase could also provide his or her user wallet address 129 to the marketplace service 116 to complete the purchase of the NFT 133. Due to the volatility of cryptocurrency markets, the marketplace service 116 could offer an exchange rate of fiat to cryptocurrency coins or tokens for a window of time sufficient for the purchaser to consummate the purchaser.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g, storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 103.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z;

X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:

a computing device comprising a processor and a memory; and machine-readable instructions stored in the memory that, when executed by the processor, cause the computing device to at least:

determine that a first amount of a cryptocurrency has been transferred to a marketplace wallet address from a first user wallet address that is hosted on a first type of blockchain technology;

access a listing ledger to determine an amount of the cryptocurrency specified in a listing of a non-fungible token (NFT), wherein the listing ledger stores at least one of an indication of the first amount of the cryptocurrency, an NFT identifier, an NFT smart contract wallet address, a user wallet address associated with a seller, a minimum bid for the NFT, or an initial bid for the NFT;

send a cryptographic challenge to a user device that submitted the listing, the cryptographic challenge being encrypted with a public key;

receive an unencrypted challenge from the user device including a signature generated by a private key that is associated with the public key;

determine that the listing is valid based at least in part on receiving the unencrypted challenge;

determine, based at least in part on determining that the listing is valid, that the first amount of the cryptocurrency matches the amount of the cryptocurrency specified in the NFT;

in response to a determination that the first amount of the cryptocurrency has been transferred to the marketplace wallet address and a determination that the first amount of the cryptocurrency matches the amount of the cryptocurrency specified in the listing of the NFT, invoke a transfer function provided by a non-fungible token (NFT) smart contract, wherein the transfer function causes ownership of a non-fungible token (NFT) managed by the NFT smart contract to be transferred to a specified user wallet address; and in response to the NFT being transferred to the specified user wallet address, utilize a bridge to wrap a second amount of the cryptocurrency from the marketplace wallet address and send the second amount of the cryptocurrency to a second user wallet address that is hosted on a second type of blockchain technology, wherein wrapping the second amount of the cryptocurrency enables the second amount of the cryptocurrency to be compatible on the second type of blockchain technology.

2. The system of claim 1, wherein the machine-readable instructions further cause the computing device to at least:

generate the marketplace wallet address as a unique wallet address for the purchase of the NFT; and evaluate a blockchain to determine that the first amount of the cryptocurrency has been transferred to a unique wallet address.

3. The system of claim 1, wherein the machine-readable instructions further cause the computing device to at least generate a unique transaction identifier for the transaction; and the machine-readable instructions that cause the computing device to determine that the first amount of the cryptocurrency has been transferred to the marketplace wallet address from the first user wallet address further cause the computing device to evaluate a blockchain to identify a transaction that comprises the unique transaction identifier to determine that the first amount of the cryptocurrency has been transferred to the marketplace wallet address.

4. The system of claim 1, wherein the machine-readable instructions further cause the computing device to at least query the NFT smart contract to determine that the NFT has been transferred to the specified user wallet address.

5. The system of claim 1, wherein the NFT smart contract is hosted on a first blockchain, and the first user wallet address is hosted on a second blockchain, and the second user wallet address is hosted on a third blockchain.

6. The system of claim 1, wherein entries in the listing ledger are created at a time that a seller of the NFT for sale through a marketplace service.

7. The system of claim 1, wherein the first type of blockchain type technology is different than the second type of blockchain type technology.

8. The system of claim 1, wherein the first type of blockchain type technology is modular blockchain and the second type of blockchain type technology is a high-throughput blockchain.

9. The system of claim 1, further comprising invoking the transfer function in response to the first type of blockchain type technology being different than the second type of blockchain type technology.

10. A method, comprising:

determining that a first amount of a cryptocurrency has been transferred to a marketplace wallet address from a first user wallet address that is hosted on a first type of blockchain technology;

accessing a listing ledger to determine an amount of the cryptocurrency specified in a listing of a non-fungible token (NFT), wherein the listing ledger stores at least one of an indication of the first amount of the cryptocurrency, an NFT identifier, an NFT smart contract wallet address, a user wallet address associated with a seller, a minimum bid for the NFT, or an initial bid for the NFT;

sending a cryptographic challenge to a user device that submitted the listing, the cryptographic challenge being encrypted with a public key;

receiving an unencrypted challenge from the user device including a signature generated by a private key that is associated with the public key;

determining that the listing is valid based at least in part on receiving the unencrypted challenge;

determining, based at least in part on determining that the listing is valid, that the first amount of the cryptocurrency matches the amount of the cryptocurrency specified in the NFT;

in response to determining that the first amount of the cryptocurrency has been transferred to the marketplace wallet address and a determination that the first amount of the cryptocurrency matches the amount of the cryptocurrency specified in the listing of the NFT, invoking a transfer function provided by a non-fungible token (NFT) smart contract, wherein the transfer function causes ownership of a non-fungible token (NFT) managed by the NFT smart contract to be transferred to a specified user wallet address; and in response to the NFT being transferred to the specified user wallet address, utilize a bridge to wrap a second amount of the cryptocurrency from the marketplace wallet address and send the second amount of the cryptocurrency to a second user wallet address that is hosted on a second type of blockchain technology, wherein wrapping the second amount of the cryptocurrency enables the second amount of the cryptocurrency to be compatible on the second type of blockchain technology.

11. The method of claim 10, further comprising:

generating the marketplace wallet address as a unique wallet address for the purchase of the NFT; and evaluating a blockchain to determine that the first amount of the cryptocurrency has been transferred to a unique wallet address.

12. The method of claim 10, further comprising:

generating a unique transaction identifier for the transaction; and determining that the first amount of the cryptocurrency has been transferred to the marketplace wallet address from the first user wallet address further comprises evaluating a blockchain to identify a transaction that comprises the unique transaction identifier to determine that the first amount of the cryptocurrency has been transferred to the marketplace wallet address.

13. The method of claim 10, further comprising querying the NFT smart contract to determine that the NFT has been transferred to the specified user wallet address.

14. The method of claim 10, wherein the NFT smart contract is hosted on a first blockchain, and the first user wallet address is hosted on a second blockchain, and the second user wallet address is hosted on a third blockchain.

15. A non-transitory, computer-readable medium, comprising machine readable instructions that, when executed by a processor of a computing device, cause the computing device to at least:

determine that a first amount of a cryptocurrency has been transferred to a marketplace wallet address from a first user wallet address that is hosted on a first type of blockchain technology;

accessing a listing ledger to determine an amount of the cryptocurrency specified in a listing of a non-fungible token (NFT), wherein the listing ledger stores at least one of an indication of the first amount of the cryptocurrency, an NFT identifier, an NFT smart contract wallet address, a user wallet address associated with a seller, a minimum bid for the NFT, or an initial bid for the NFT;

sending a cryptographic challenge to a user device that submitted the listing, the cryptographic challenge being encrypted with a public key;

receiving an unencrypted challenge from the user device including a signature generated by a private key that is associated with the public key;

determining that the listing is valid based at least in part on receiving the unencrypted challenge;

determining, based at least in part on determining that the listing is valid, that the first amount of the cryptocurrency matches the amount of the cryptocurrency specified in the NFT;

in response to a determination that the first amount of the cryptocurrency has been transferred to the marketplace wallet address and a determination that the first amount of the cryptocurrency matches the amount of the cryptocurrency specified in the listing of the NFT, invoke a transfer function provided by a non-fungible token (NFT) smart contract, wherein the transfer function causes ownership of a non-fungible token (NFT) managed by the NFT smart contract to be transferred to a specified user wallet address; and in response to the NFT being transferred to the specified user wallet address, utilize a bridge to wrap a second amount of the cryptocurrency from the marketplace wallet address and send the second amount of the cryptocurrency to a second user wallet address that is hosted on a second type of blockchain technology, wherein wrapping the second amount of the cryptocurrency enables the second amount of the cryptocurrency to be compatible on the second type of blockchain technology.

16. The non-transitory, computer-readable medium of claim 15, wherein the machine-readable instructions further cause the computing device to at least:

generate the marketplace wallet address as a unique wallet address for the purchase of the NFT; and evaluate a blockchain to determine that the first amount of the cryptocurrency has been transferred to a unique wallet address.

17. The non-transitory, computer-readable medium of claim 15, wherein the machine-readable instructions further cause the computing device to at least generate a unique transaction identifier for the transaction; and wherein the machine-readable instructions that cause the computing device to determine that the first amount of the cryptocurrency has been transferred to the marketplace wallet address from the first user wallet address further cause the computing device to evaluate a blockchain to identify a transaction that comprises the unique transaction identifier to determine that the first amount of the cryptocurrency has been transferred to the marketplace wallet address.

18. The non-transitory, computer-readable medium of claim 15, wherein the machine-readable instructions further cause the computing device to at least query the NFT smart contract to determine that the NFT has been transferred to the specified user wallet address.

* * * * *